United States Patent [19]

Hosman

[11] Patent Number: 4,852,834
[45] Date of Patent: Aug. 1, 1989

[54] UNIVERSAL MOUNTING POST ASSEMBLY

[75] Inventor: Reo Hosman, Little Rock, Ark.

[73] Assignee: Osppco, Inc., Little Rock, Ark.

[21] Appl. No.: 232,463

[22] Filed: Aug. 15, 1988

[51] Int. Cl.⁴ ............................................... A45F 3/44
[52] U.S. Cl. .................................. 248/156; 248/205.1;
248/221.2; 248/530; 248/125; 52/165
[58] Field of Search ............... 248/156, 530, 533, 150,
248/545, 558, DIG. 6, 205.1, 125, 219.1, 219.3,
221.2, 125; 174/63, 60; 220/3.9; 52/165, 156

[56] References Cited

U.S. PATENT DOCUMENTS

| | | | |
|---|---|---|---|
| 606,558 | 6/1898 | Ketchum | 248/156 |
| 1,515,216 | 11/1924 | Kissinger | 248/DIG. 6 |
| 1,597,573 | 8/1926 | Blue | 248/156 X |
| 1,718,878 | 6/1929 | Raguette | 248/DIG. 6 |
| 2,953,625 | 9/1960 | Hasselhorn | 174/60 |
| 3,164,668 | 1/1965 | Skubal | 174/37 X |
| 3,502,785 | 3/1970 | Nickola | 248/156 X |
| 3,758,062 | 9/1973 | Caldwell et al. | 248/156 |
| 3,868,080 | 2/1975 | Olson | 248/156 X |
| 4,076,198 | 2/1978 | Garrett | 248/156 X |
| 4,790,505 | 12/1988 | Rose et al. | 248/205.1 |

*Primary Examiner*—Ramon S. Britts
*Assistant Examiner*—Karen J. Chotkowski
*Attorney, Agent, or Firm*—Stephen D. Carver

[57] ABSTRACT

A universal mounting stake assembly for installing one or more electrical junction boxes, terminal boxes, or Subscriber Network Interfaces (SNI's). The assembly comprises a specially configured ground engaging stake, an appropriately configured receiving plate adapted to be coupled to the stake, and an optional driving cap. The stake includes a plurality of regularly spaced apart plate receptive notches, a service wire receptive channel longitudinally coextensive with its length, and a plurality of regularly spaced apart stud receptive fastener orifices for locating a stud which will secure the plate after installation. The plate comprises a variety of adaptably configured orifices enabling a variety of SNI or similar devices to be easily affixed thereto. The receiving plate is attached to the stake by fitting its tabbed, flanged end to an appropriate user selected pair of stake notches. The plate has a plurality of regularly spaced apart keyed slots that mate with at least one stake fastener stud when the tabbed plate end is fitted to the appropriate stake notches. The optional driving cap comprises a rigid hollow base adapted to receive the top of the stake, and a flat striking surface for hammer actuation. The hollow base, preferably of a triangular cross section, includes an internal guide cylinder to a quickly mate the cap with the stake geometry. The stake is prevented from being inadvertently withdrawn from the ground by a pair of anti-pullout barbs.

20 Claims, 4 Drawing Sheets

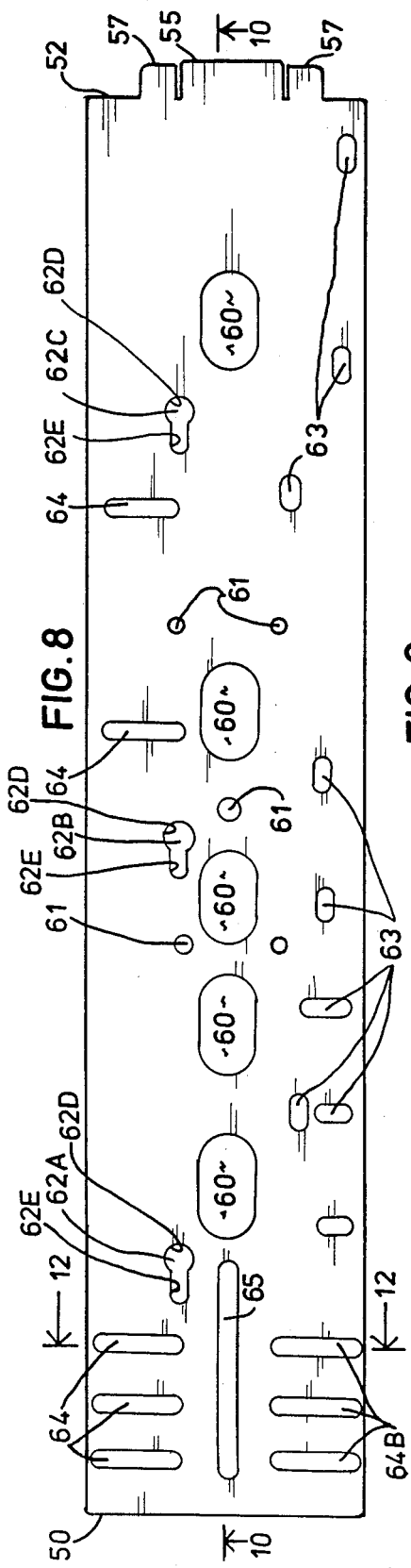
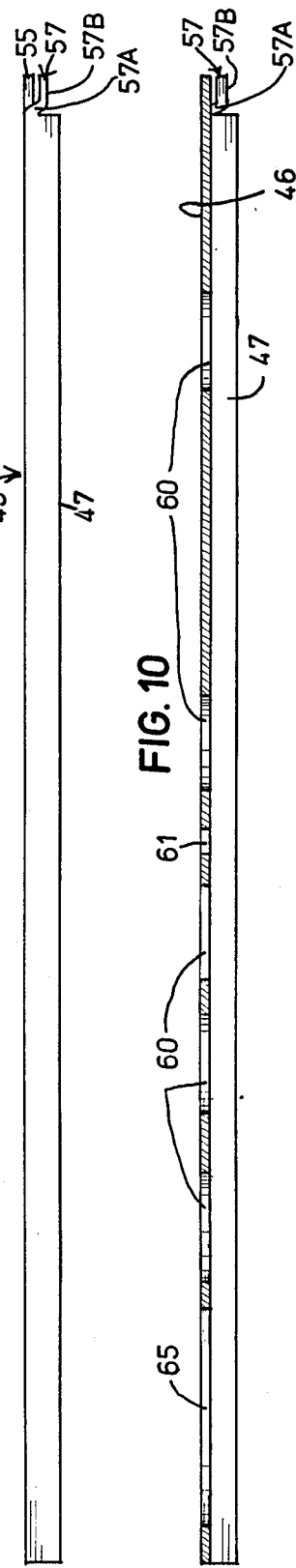
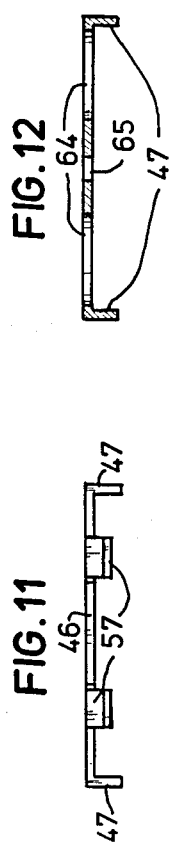

UNIVERSAL MOUNTING POST ASSEMBLY

BACKGROUND OF THE INVENTION

The present invention relates generally to mounting stakes for installing terminal boxes, connector boxes, electrical interface boxes or the like. More particularly, the present invention relates to a stake and plate system for installing terminal boxes such as utility subscriber junction boxes or subscriber network interface boxes (SNI's). The invention is believed best classified in Class 248, Subclass 49.

A variety of terminal boxes have evolved over the years for forming junctions between incoming utility wires and those wires leading internally of residences, utility buildings or the like. Concurrently, the need for such devices, and the need for mounting such devices, have increased as more and more users subscribe to cable television, install multiple phone lines, or otherwise avail themselves of various utilities. Typically, building structures that lack a continuous support foundation do not provide a convenient means by which terminal boxes and SNI hookups may be adequately secured and received. Hence it is known to provide a mount through a stake system. However, varying installations facing the installer has hitherto require him to inventory a plurality of stakes of varying lengths, nominally providing for three foot, three and one half foot, and four foot installations.

Modern terminal boxes, such as subscriber network interfaces (hereinafter "SNI's") include protective housings which must be securely mounted adjacent the building or residence being serviced by the installer. The vast majority of the commercially available SNI devices like the KEPTEL SNI 2100 and 4600 series, AT & T's 200 and 400 series, SIECOR CAC 1000 series, the COOK ELECTRIC's 501-2600 series, and the GTE Sylvania CP700 and CP800 are encased in their own unique protective housing which guards against inclement weather, and other potentially destructive events. The housing configurations differ significantly between manufacturers, as do the manner in which a particular SNI device is to be mounted on a receiving plate member.

A typical SNI housing includes a plurality of bosses for receiving conventional fasteners such as bolts and/or self tapping screws. Some SNI housings employ a plastic anchor assembly which is designed to be pinched together and passed through a receiving orifice. Whatever mounting configuration and method is employed by a particular manufacturer of SNI devices, the fastener must connect the mounting surface to the SNI housing or vice versa. SNI's are usually installed upon some form of mounting system, often in the form of a stake. A typical stake is adapted to be driven into the ground, and a SNI reception plate is affixed to the stake top.

As will be appreciated by those skilled in the art it is advantageous to have both the stake portion and the mounting surface be rigid and yet lightweight. The combination must be durable and resistant to the elements to maintain its installed position for long periods of time without significant deterioration. Further, the stake portion of the mounting system should shield and protect incoming wires. U-shaped or V-shaped mounting stakes prove particularly effective when used for this purpose, since they can inherently house the service wires.

It will be further appreciated that in order to effectively drive the stake member into the ground without damaging it, a means for enabling the stake to be forcibly struck without jeopardizing its integrity is desirable. U.S. Pat. No. 4,076,198 issued to Garrett on Feb. 28, 1978 addresses this problem. The latter patent, which discloses what is believed to be the most pertinent prior art, features a thin impact receiving washer permanently fixed atop a V-shaped mobile home telephone stake. This washer is forcibly struck by a mallet or hammer thereby driving the stake into the ground. However, the particular configuration thereshown makes the stake cumbersome for certain mounting purposes. In addition, the size of the washer must be relatively the same size as the projected circular diameter of the stake. If this were not true, any offcenter blow to the washer would prove deleterious to the stake by inducing a bending moment.

In order to ease the mounting of a SNI device it is desirable to have the mounting surface removable from, and attachable to, the stake member that is driven into the ground. Hence, the SNI device may be fastened to the mounting surface receiving plate prior to attachment of the receiving plate to the stake member, thereby making the entire mounting process less difficult than it would be if attempting to mount the SNI directly to a vertical stake. The latter concept is also disclosed in U.S. Pat. No. 4,076,198.

The majority of known prior art mounting systems disclose mounting surfaces that are integral with the stake. U.S. Pat. Nos. 4,076,198 issued to Garrett on Feb. 28, 1978, and 3,868,080 issued to Olson on Feb. 25, 1975, are the only known references disclosing a form of two piece construction having a removable mounting surface. However, the specification and the claims disclosing the respective mounting surfaces of the '198 and '080 patents are not designed to accommodate a variety of SNI devices, but are limited solely to telephone jacks.

U.S. Pat. Nos. 3,180,920 granted to D. H. Fletcher et al. on Apr. 27, 1965, and 3,164,668 granted to J. J. Skubal on Jan. 5, 1965, disclose a pedestal which function as receiving terminals for wires. These particular pedestal means also function as electrical "ground" contacts. Thus the pedestal forms an integral part of the operative wiring system. Consequently, the last mentioned patents do not provide a receiving means for the variety of SNI devices that are commercially available like those mentioned above.

In accordance with the prior art teachings in this field of invention, it appears that a mounting means designed to effectively accommodate most all protective housings associated with the variety of subscriber network interfaces, and hookups of a similar nature, has yet to be developed. It also appears that a mounting stake communicating with a separate mounting plate member having numerous properly located receiving orifices could provide a rigid composite system which would be easy to install and dependable thereafter. It is also necessary to provide a stake system which can be varied in length to accommodate different installation parameters.

SUMMARY OF THE INVENTION

The present invention comprises a mounting post assembly for installing any one of a variety of conventional terminal boxes (SNI's) at a desired user selectable height. The post assembly inherently accommodates a wide variety of such devices, and it is easy and convenient to install. In the best mode the system comprises a mounting stake adapted to be driven into the ground, a receiving plate providing a "quick connect" intermediary surface between the SNI to be installed and the stake at a desired user selected distance above ground, and a driving cap which removably mates with the stake during installation.

The stake portion of the claimed invention, is rigid and elongated, with a V-shaped channel substantially longitudinally disposed about its length. The channel enables SNI wires, typically emanating from underground, to be protectively shrouded. In addition a ground rod may be shrouded as well. The SNI wires may be secured within the channel by conventional cable ties that pass through the orifices disposed adjacent to the channel. Anti-pullout barbs disposed near the bottom of the stake tend to prevent the stake member from being inadvertently withdrawn from the ground once it has been driven into it.

The rigid receiving plate member hosts a variety of geometrically arranged and spaced-apart mounting orifices such as service wire slots, holes, and keyed slots. The multiplicity of orifices are disposed about the receiving plate in a calculated fashion so as to align with the mounting apertures of a variety of differently configured SNI devices. Moreover, the plate configuration, in combination with the stake design, enables the SNI to be positioned at user desired heights. At the bottom of the receiving plate are depressed tabs and a prong flange that engagingly contact and effectively wedge the plate member against the stake.

The optional driving cap member is rigidly constructed, typically of some metal compound or alloy combination. The most important features of the cap are the large flat upper striking surface, a striking surface edge illustrating the effective thickness of the striking surface, and the triangular hollow base portion. The driving cap is mateably slipped over the plate receptive end of the stake member, and repeatedly struck with a mallet, or hammer, thereby driving the opposing end into the ground without damaging the stake member.

A typical SNI or similar device complete with wire connections, may be operatively mounted upon the receiving plate of the claimed invention. The wires of the SNI device pass through one of a plurality of service wire exit holes. The receiving plate may then be effectively attached to the stake member, allowing the SNI wires to be shrouded by the stake within the channel.

Thus a basic object of the present invention is to provide a user friendly stake system for quickly and easily installing terminal boxes such as SNI's or the like.

Another basic object of the present invention is to provide an easy-to-use multi-part installation post assembly.

An object of the present invention is to provide a means for supporting a variety of electrical terminal boxes and SNI devices above ground near buildings without the use of a support foundation, and at a variety of user chosen heights above ground. It is a feature of the present invention that mounting heights of three feet, three and one half feet, and four feet are readily accommodated by varying the connection point of the plate relative to the stake.

Another object of the present invention is to provide a durable, rigid, weather resistant mounting means for electrical terminal boxes and SNI devices.

An object of the present invention is to provide a means for driving an SNI or terminal box support stake into the ground without damaging the stake.

Another object of the present invention is to enable a stake to be driven into hard pan or rocky soil without damaging the stake.

Yet another object of the present invention is to prevent the SNI or terminal box support stake from being uprooted once it has been driven into the earth.

Another object of the present invention is to facilitate easy mounting of an SNI or similar device, to a receiving plate by way a multiplicity of geometrically configured orifices.

Another object of the present invention is to accommodate virtually any type of mounting fastener, cable tie, lead wires and connections used to secure the terminal box or SNI device to the receiving plate.

Another object of the present invention is to attach the receiving plate to the stake without permanently affixing it thereto.

Yet another object of the present invention is to attach the receiving plate to the stake with only a minimum requirement of tools.

Another object of the present invention is to simplify the interconnection between the receiving plate from its host stake, to thereby facilitate installation, operation and maintenance.

Another object of the present invention is to avoid the cumbersome installation one would experience if trying to mount the SNI or similar device directly to a fixed vertical stake.

Another object of the present invention is to mount a variety of SNI devices like the KEPTEL SNI 2100 and 4600 series, AT&T's 200 and 400 series, SIECOR CAC 1000 series, COOK ELECTRIC,S 501-2600 series, and the GTE Sylvania CP700 and CP 800 models.

Another object of the present invention is to mount a plurality of the aforementioned SNI or similar devices on one post thereby minimizing the overall number of posts needed to be used.

Another object of the present invention is to protectively shroud wire connections that link the SNI device to an external source.

A related object is to provide a stake which will at least partially surround and protect a ground rod where used.

A similar object is to provide a stake driving system which will concurrently drive a ground rod.

Another object of the present invention is to readily receive tie down straps or harnesses so as to restrain the wire connections of the SNI or similar device within the stake channel.

These and other objects and advantages of the present invention, along with features of novelty appurtenant thereto, will appear or become apparent in the course of the following descriptive sections.

BRIEF DESCRIPTION

In the following drawings, which form a part of the specification and which are to be construed in conjunction therewith, and in which like reference numerals have been employed throughout wherever possible to indicate like parts in the various views:

FIG. 8 is a top plan view of the preferred receiving plate;

FIG. 9 is a side plan view of the receiving plate of FIG. 8;

FIG. 10 is an axial cross-sectional view of the receiving plate member generally taken along line 10—10 of FIG. 8;

FIG. 11 is a bottom elevational view of the receiving plate member shown in FIG. 8;

FIG. 12 is a cross sectional view taken along line 12—12 of FIG. 8;

DETAILED DESCRIPTION

Figure 1:
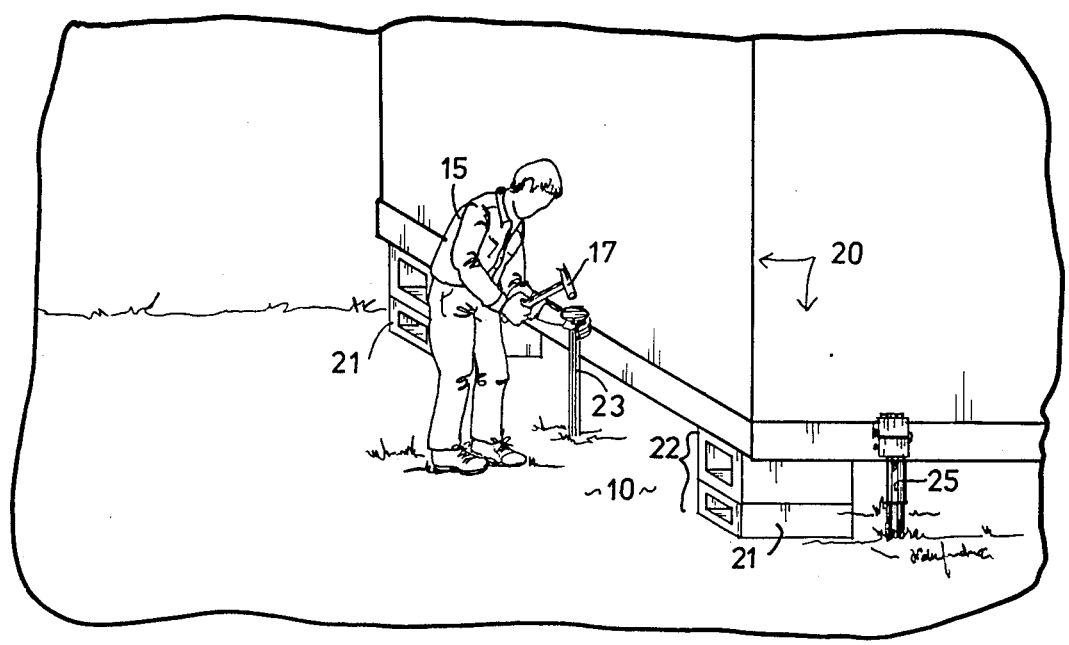
FIG. 1 is a fragmentary, pictorial view depicting an environmental setting in which the claimed invention may be utilized.

With initial reference directed now to FIG. 1 of the appended drawings, a building structure 20 of conventional construction is illustrated. Building 20 may comprise a trailer house or other similar structure lacking a continuous support foundation, and it is thus elevated above the ground by supports 21 at a distance 22 above ground 10 which varies with different installations. Man 15 in an effort to drive the stake of the claimed invention into the ground, is forcibly striking the surface of the driving cap of system 23 with hammer 17. Once the stake of system 23 has been driven into the ground, a receiving plate, with SNI or similar devices already mounted thereon, may be attached thereto. System 25 is representative of this static configuration: an SNI device has been operatively mounted to the stake assembly appurtenant to a building structure 20.

Figure 2:
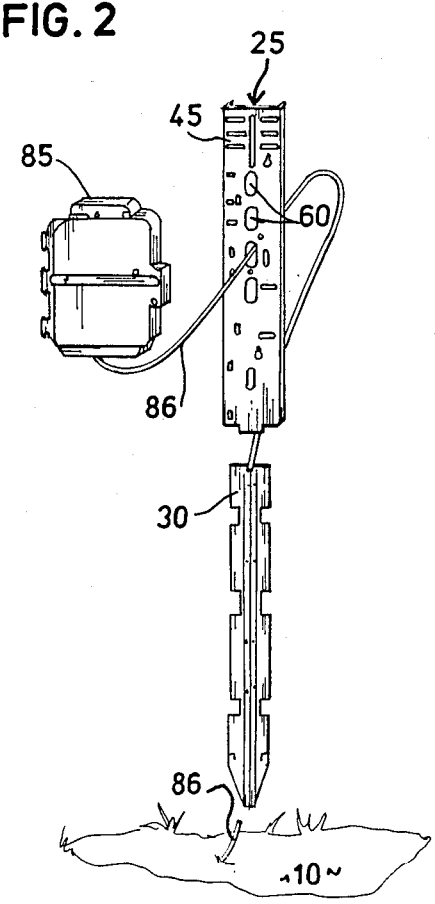
FIG. 2 is an exploded, fragmentary perspective view illustrating primary components of the invention and a typical SNI device adapted to be mounted thereon.
Figure 3:
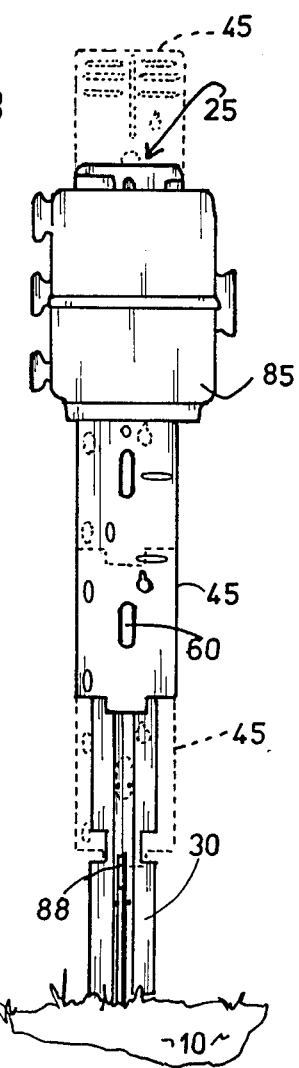
FIG. 3 is a fragmentary front plan view of an SNI device operatively attached to the claimed invention.

With additional reference directed now to FIG. 2, the components of system 25 (FIG. 1) are shown aligned prior to attachment and communication with one another. FIG. 3 reveals how the components appear after SNI installation. A typical SNI device 85 complete with wire connections 86, is operatively mounted upon receiving plate 45, which in turn is attached to stake member 30. Wires 86 of said SNI device 85 pass through one of a plurality of service wire exit holes 60.

Figure 7:
FIG. 7 is a cross-sectional view generally taken along line 7—7 of FIG. 4.
Figure 6:
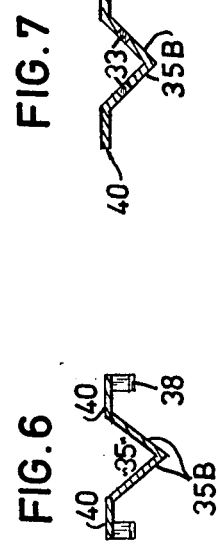
FIG. 6 is a cross sectional view generally taken along line 6—6 of FIG. 4.

Rigid stake 30, best shown in FIGS. 4-7, comprises a tapered ground engaging end 32 spaced apart from an integral plate receptive end 34. As best revealed in FIGS. 6 and 7, the stake is of a generally V-shaped profile, comprising a central channel 35 bordered by edge flanges 40. Channel 35 is longitudinally coextensive and spans the entire axial length of said stake 30, including a front channel surface 35A centered between edge flanges 40, as best seen in FIGS. 6 and 7. Edge flanges 40 host a plurality of spaced apart attachment stud holes 41 at least one of which is preferably fitted with a self tapping fastener 39 or 39A. Anti-pullout barbs 38 statically prohibit the stake member 30 from being inadvertently withdrawn once it has been driven into the ground.

Channel 35 enables the wires of an SNI device, which typically emanate from underground, to be protectively shrouded. The SNI wires are secured within channel 35 by conventional cable ties that pass through the orifices 33 in surface 35A, around the SNI cables, and around the backside of the channel 35B, thereby completing the tie down loop.

Stake 30 also comprises regularly spaced apart pairs of vertical tab receiving notches 37A, 37B and 38C defined in the flanged edges 40. Each individual notch has a lower contact edge 37D. Notches 37A-C and notch edges 37D allow engagement with the depressed receiving plate mounting tabs 57 (FIG. 8). Attachment stud holes 41 may serve a variety of useful purposes, te most important of which is to accommodate a primary fastener 39 or 39A for facilitating the attachment of the receiving plate member 45 (FIGS. 8-12), to the stake 30. Importantly, stud holes 41 are located such the primary fastener will automatically register with an appropriate keyed slot plate orifice when the plate is installed against the stake, as will hereinafter be described.

With attention now directed to FIGS. 8-12, a SNI receiving plate is generally designated by the reference numeral 45. Plate end 50 is provided with two groups of horizontal mounting slots 64, 64B. Each of these slots are horizontally configured, and they are arranged in the form of two families of similar vertically spaced apart slots on either side of vertical divider slot 65. Slots 64, 64B enable a SNI to be adjusted width wise relative to the plot, in order to find an available boss in the SNI which will properly register with the plate. Slot 65 concurrently enables vertical adjustments to the SNI when seeking registration.

The stake also comprises a flanged ground engaging end 52, and sides 47. End 52 includes a prong flange 55, and a pair of depressed tabs 57 having an angled region 57A and a tang region 57B both integrally associated therewith. Surface 46 is host to a plurality of mounting slots 63-65, service wire exit holes 60, cable tie down holes 61, and keyed slot 62A, 62B, and 62C. Keyed slots 62A-C all have a circular region 62D and a slot region 62E integrally associated therewith. Each individual orifice has been accurately positioned so as to align with the mounting apertures integrally associated with the housings of a variety of SNI or terminal boxes. The SNI or similar device may be mounted to the plate at various positions.

Once the SNI or other similar device has been mounted to the receiving plate 45, said plate is attached to the stake 30 at any of the three different positions. Depending on the position selected by the user, the overall combined length of the attached plate and stake configuration can be three feet, three and one half feet, or four feet. When the receiving plate is attached at the four foot position, cable tie down holes 61 accommodate conventional ties that will fasten the exposed portion of the SNI wires to the backside of the plate 45 before they enter the channel 35.

How the plate 45 engagingly attaches to the stake 30 is best understood by viewing FIGS. 2, 3, 4 and 8 concurrently. Once the user has selected a desired height the appropriate keyed slot 62A, 62B, or 62C is to be mated with at least one of the attachment studs 39 or 39A that occupy the attachment stud holes 41, while a corresponding pair of notches 37A, 37B, or 37C will engage the depressed tabs 57 of plate 45. Which holes, notches, and studs will be utilized to effectively attain a desired height will be hereinafter described as operations.

Irrespective of the selected height of attachment, the circular portion 62D of keyed slots 62A-C of plate 45 receive at least one of the primary fastener studs 39 or 39A disposed on stake 30; at the same time, vertical tab notches 37A, 37B, or 37C, of stake 30 will be relationally aligned and receive the depressed tabs 57 of plate 45. Prong flange 55 of plate 45 abuts the flanged edges 40 of the stake 30. The receiving plate 45 is now in the readily engageable position and is manually shoved downward by the person attaching the receiving plate 45 to the stake 30. The receiving plate experiences a slight downward shift relative to the stake, causing the primary fastener studs 39 and/or 39A to enter and engage the slot portion 62E of the keyed slots 62A, 62B, or 62C. The angled region of the depressed tabs 57A fully seat on the lower edges of notches 37D and tang region 57B aligns parallel with the backside of the flanged edges 40 of stake 30. Prong flange 55 forcibly abuts, and applies a wedging contact to the flanged edges 40 of the stake 30. Removal of the receiving plate 45 is accomplished by the reverse process.

Figure 13:
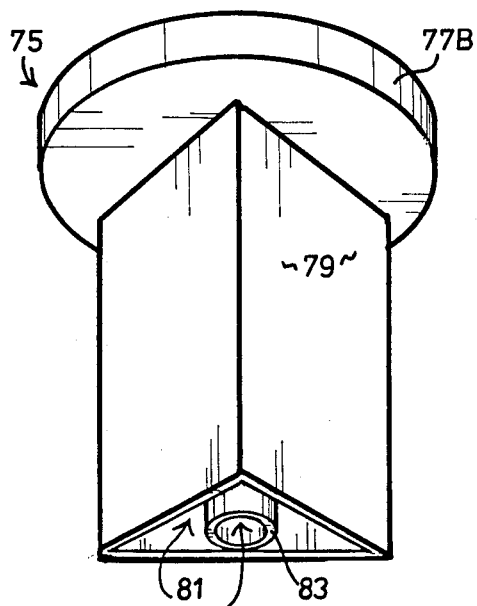
FIG. 13 is a bottom perspective view of the optional driving cap.
Figure 14:
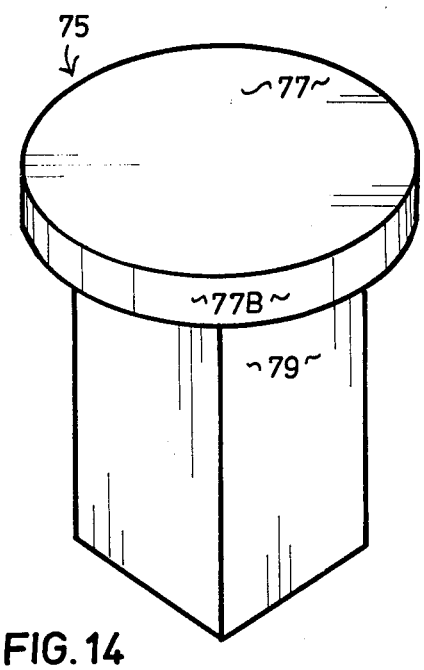
FIG. 14 is a top perspective view of the optional driving cap.

An optional driving cap 75 is shown in Figures 13 and 14. It may be temporarily placed upon the stake during system installation to help drive the stake into the ground. Cap 75, which is preferably constructed of rigid steel, comprises a flat upper striking surface 77, a striking surface edge 77B, and a generally triangular hollow base portion 79. Base portion 79 incorporates a guide cylinder 83 contained within the hollow cavity 81 of said base. Guide cylinder 83 aligns within stake channel 35 when cap 75 is fitted over the plate receiving end 34 of the stake, so as to align the cap relative to the stake. Additionally, the hollow interior 84 of cylinder 83 admits a ground rod when one is required, so that the cap may be used to drive ground rods as well. With reference to FIG. 3, ground rod 88 will be disposed substantially within the stake channel 35.

The generally triangular shape of the base 79 and region 81 (FIG. 13), and the interior disposition of the guide cylinder 83 relative thereto, prohibits the cap from experiencing substantial movements out of line with stake 30 prior to, or between successive blows. Hence, when positioned properly, cap 75 may be forcibly hammered to drive the stake into the ground. The force associated with each blow is transferred through the cap 75 to the stake 30, without inducing substantial bending moments which would jeopardize the integrity of the stake 30. In particular, the flanged edges 40 of the stake will not be bent during installation. Stake deformation during pounding is additionally resisted by the tapered tops 36 of the flange edges (FIG. 4).

Operation

The mechanics of attaching the receptive plate 45 complete with a SNI or similar device to the stake 30 may be facilitated in the following manner. The user selects a desired attachment height usually corresponding to the distance the building structure has been elevated above the ground 22 in FIG. 1. Selecting an attachment height in this manner, enables the user to have the SNI or other device custom installed to provide the most efficient servicing possible.

Figure 4:
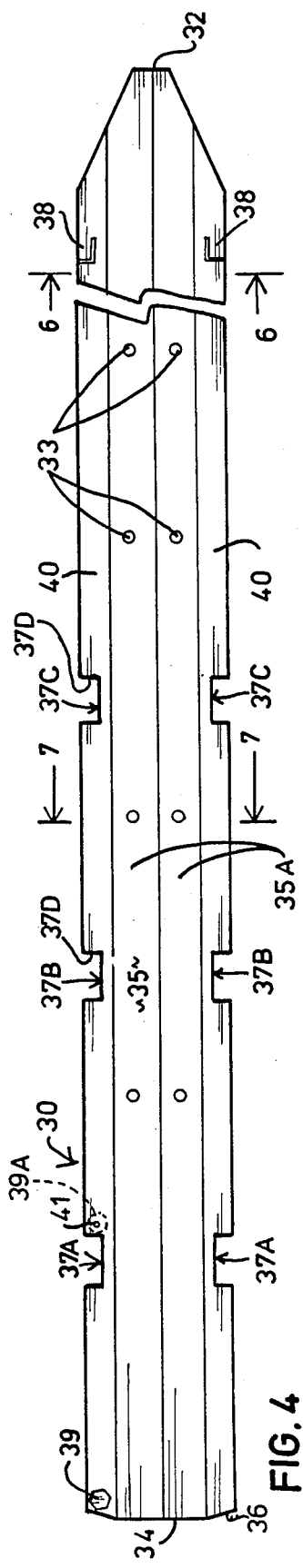
FIG. 4 is a fragmentary longitudinal top plan view of the stake member.
Figure 5:
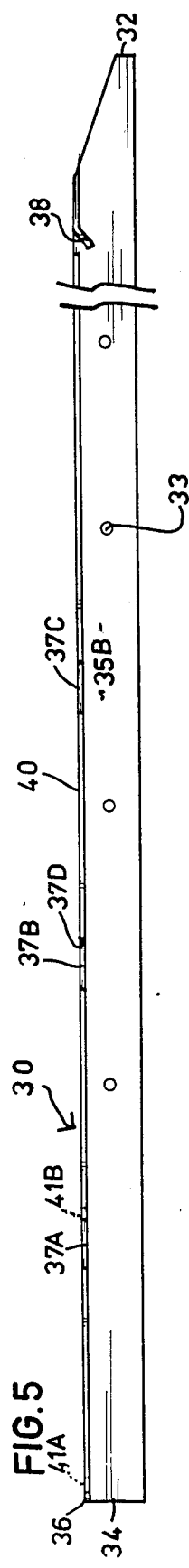
FIG. 5 is a fragmentary longitudinal side plan view of the stake with the primary stud removed.

Reference to FIGS. 4 and 8 concurrently will effectively illustrate the ability of the invention to be selectively varied in overall length. In other words, the working length of the attached stake and plate configuration may be adjusted. If the user selects the three foot length, fastener stud 39 will engage keyed slot 62A, and/or fastener stud 39A will engage keyed slot 62B; the depressed tabs 57 must necessarily engage notch pair 37C. If the user selects the three and one half foot length, fastener stud 39 will engage keyed slot 62B, and/or fastener stud 39A will engage keyed slot 62C; the depressed tabs 57 must necessarily engage notch pair 37B. If the user selects the four foot length, fastener stud 39 must necessarily engage keyed slot 62C, and depressed tabs 57 must necessarily engage notches 37A.

The SNI is best attached to the plate prior to installation of the plate upon the stake. Of course, the user may first attached the plate if desired. When attachments are made, the plate may be variably positioned as described relative to the stake, and the SNI may be variably positioned relative to the plate such that proper registration is achieved vis-a-vis such holes as 64, 64B and/or 65. At any rate, the service wire will be generally constrained within the stake channel 35, preferably being secured by conventional plastic wire ties, which penetrate stake holes 33 (FIG. 4). The wire may then be routed between the stake, the plate, and the SNI through a convenient one of the vertically spaced apart service wire exit holes 60 defined on the plate.

From the foregoing, it will be seen that this invention is one well adapted to obtain all the ends and objects herein set forth, together with other advantages which are inherent to the structure.

It will be understood that certain features and subcombinations are of utility and may be employed without reference to other features and subcombinations. This is contemplated by and is within the scope of the claims.

As many possible embodiments may be made of the invention without departing from the scope thereof, it is to be understood that all matter herein set forth or shown in the accompanying drawings is to be interpreted as illustrative and not in a limiting sense.

What is claimed is:

1. A universal mounting post assembly for mounting one or more terminal boxes such as telephone subscriber network interfaces (SNI's), telephone protectors, CATV connectors, and similar electrical terminal boxes, said mounting post assembly comprising:

a rigid, elongated, stake having a plate receptive end and a spaced apart, integral ground engaging end, a depressed, generally V-shaped central reinforcing channel substantially longitudinally coextensive with the length of said stake which receives the service wire, flange-like edges bordering said channel, a fastening means at least one stud receptive orifice defined in said stake adjacent said channel for receiving said fastening means, and a plurality of regularly spaced apart pairs of notches formed in said edges; and, a rigid, receiving plate adapted to be firmly attached to said plate receptive end of said stake at a user selected location, said plate comprising:

tab means for engaging a user suitable one of said pairs of notches defined in said stake, thereby positioning said plate at a user desired height; and, a plurality of regularly spaced apart keyed slots defined in said plate, at least one of said slots adapted to be engaged by said fastening means when said tab means seats within the selected pair of notches, substantially concurrently with the engagement of said tab means within said notches.

2. The assembly as defined in claim 1 wherein said tab means includes a prong flange for wedging said tab means into said notches when said plate is fitted to said stake.

3. The assembly as defined in claim 2 wherein said plate comprises a plurality of regularly spaced apart user selectable service wire exit holes for conducting the service wire from said channel through said plate into said SNI.

4. The assembly as defined in claim 3 wherein said stake comprises a plurality of fastener accommodating orifices disposed along said stake adjacent said channel facilitating the installation of a plurality of plastic cable ties or the like to secure the service wire within said channel.

5. The assembly as defined in claim 4 wherein said stake member comprises a pair of anti-pullout tabs defined in said ground engaging end for preventing the inadvertent withdrawal of said stake.

6. The assembly as defined in claim 5 wherein said plate comprises a pair of families of horizontal slots for accommodating horizontal SNI adjustments to facilitate registration, and a vertical slot disposed between said pair of families for accommodating vertical SNI adjustments to facilitate registration.

7. The assembly as defined in claim 1 including a driving cap adapted to be coupled to said plate receptive end of said stake to facilitate the driving of said stake into the ground.

8. The assembly as defined in claim 7, said cap comprising:
a hollow base for mating the cap to said stake member;
a guide associated with said base for engaging said stake channel when said cap is mated to said stake to correctly position said cap and to optionally receive a ground rod, whereby said cap may drive both the stake and the ground rod simultaneously;
a flat striking surface integral with said base adapted to be contacted by a hammer to facilitate problem free driving of the stake member into the ground.

9. A universal mounting post assembly for mounting one or more terminal boxes such as telephone subscriber network interfaces (SNI's), telephone protectors, CATV connectors, and similar electrical terminal boxes, said mounting post assembly comprising:
a rigid, elongated, stake having a plate receptive end and a spaced apart, integral ground engaging end, a depressed, generally V-shaped central reinforcing channel substantially longitudinally coextensive with the length of said stake which receives the service wire, flange-like edges bordering said channel, a fastening means at least one stud receptive orifice defined in said stake adjacent said channel for receiving said fastening means, and a plurality of regularly spaced apart pairs of notches formed in said edges;
a rigid, receiving plate adapted to be firmly attached to said plate receptive end of said stake at a user selected location, said plate comprising:
tab means for engaging a user suitable one of said pairs of notches defined in said stake thereby positioning said plate at a user desired height, said tab means comprising a prong flange for wedging said tab means against said notches as said plate is fitted to said stake; and,
a plurality of regularly spaced apart keyed slots defined in said plate, at least one of said slots adapted to be engaged by said fastening means when said tab means seats within the selected pair of notches, substantially concurrently with the engagement of said tab means within said notches.

10. The assembly as defined in claim 9 wherein said plate comprises a plurality of regularly spaced apart user selectable service wire exit holes for conducting the service wire from said channel through said plate into said SNI.

11. The assembly as defined in claim 10 wherein said stake comprises a plurality of fastener accommodating orifices disposed along said stake adjacent said channel facilitating the installation of a plurality of plastic cable ties or the like to secure the service wire within said channel.

12. The assembly as defined in claim 11 wherein said stake member comprises a pair of anti-pullout tabs defined in said ground engaging end for preventing the inadvertent withdrawal of said stake.

13. The assembly as defined in claim 11 wherein said plate comprises a pair of families of horizontal slots for accommodating horizontal SNI adjustments to facilitate registration, and a vertical slot disposed between said pair of families for accommodating vertical SNI adjustments to facilitate registration.

14. A universal mounting post assembly for mounting one or more terminal boxes such as telephone subscriber network interfaces (SNI's), telephone protectors, CATV connectors, and similar electrical terminal boxes, said mounting post assembly comprising:
a rigid, elongated, stake having a plate receptive end and a spaced apart, integral ground engaging end, a depressed, generally V-shaped central reinforcing channel substantially longitudinally coextensive with the length of said stake which receives the service wire, flange-like edges bordering said channel, and a plurality of regularly spaced apart pairs of notches formed in said edges;
a rigid, SNI receiving plate adapted to be firmly attached to said plate receptive end of said stake at a user selected location, said plate comprising tab means for engaging a user suitable one of said pairs of notches defined in said stake, thereby positioning said plate at a user desired height, said tab means including prong flange means for wedging said tab means against said notches as said plate is fitted to said stake, and said plate comprising a plurality of regularly spaced apart user selectable service wire exit holes for conducting the service wire from said channel through said plate into said SNI.

15. The assembly as defined in claim 14 wherein said stake comprises at least one stud receptive orifice for receiving a primary fastener, and said plate comprises a plurality of regularly spaced apart keyed slots, at least one of said slots adapted to be engaged by said primary fastener when said tab means seats within the selected pair of notches, substantially concurrently with the engagement of said tab means within said notches.

16. The assembly as defined in claim 14 wherein said stake comprises a plurality of fastener accommodating orifices disposed along said stake adjacent said channel facilitating the installation of a plurality of plastic cable ties or the like to secure the service wire within said channel, and said stake member comprises a pair of anti-pullout tabs defined in said ground engaging end for preventing the inadvertent withdrawal of said stake.

17. The assembly as defined in claim 16 wherein said plate comprises a pair of families of horizontal slots for accommodating horizontal SNI adjustments to facilitate registration, and a vertical slot disposed between said pair of families for accommodating vertical SNI adjustments to facilitate registration.

18. The assembly as defined in claim 17 including a driving cap adapted to be coupled to said plate receptive end of said stake to facilitate the driving of said stake into the ground.

19. The assembly as defined in claim 18 wherein said cap comprises:
- a hollow base for mating the cap to said stake member;
- a guide associated with said base for engaging said stake channel when said cap is mated to said stake to correctly position said cap and to optionally receive a ground rod, whereby said cap may drive both the stake and the ground rod simultaneously;
- a flat striking surface integral with said base adapted to be contacted by a hammer to facilitate problem free driving of the stake member into the ground.

20. The assembly as defined in claim 19 wherein said stake IS comprises at least one stud receptive orifice for receiving a primary fastener, and said plate comprises a plurality of regularly spaced apart keyed slots, at least one of said slots adapted to be engaged by said primary fastener when said tab means seats within the selected pair of notches, substantially concurrently with the engagement of said tab means within said notches.

* * * * *